(12) United States Patent
Bissontz

(10) Patent No.: US 9,114,723 B2
(45) Date of Patent: Aug. 25, 2015

(54) HYBRID ELECTRIC VEHICLE POWER MANAGEMENT SYSTEM

(75) Inventor: Jay E. Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 165 days.

(21) Appl. No.: 13/985,340

(22) PCT Filed: Mar. 15, 2011

(86) PCT No.: PCT/US2011/028480
§ 371 (c)(1),
(2), (4) Date: Aug. 14, 2013

(87) PCT Pub. No.: WO2012/125158
PCT Pub. Date: Sep. 20, 2012

(65) Prior Publication Data
US 2013/0342167 A1    Dec. 26, 2013

(51) Int. Cl.
| | | |
|---|---|---|
| *B60W 10/00* | (2006.01) | |
| *B60L 11/18* | (2006.01) | |
| *B60W 20/00* | (2006.01) | |
| *B60W 10/08* | (2006.01) | |
| *B60W 10/30* | (2006.01) | |
| *B60W 30/18* | (2012.01) | |
| *B60L 1/00* | (2006.01) | |
| *B60L 7/22* | (2006.01) | |
| *H02J 7/14* | (2006.01) | |

(52) U.S. Cl.
CPC ............. *B60L 11/1866* (2013.01); *B60L 1/003* (2013.01); *B60L 7/22* (2013.01); *B60W 10/08* (2013.01); *B60W 10/30* (2013.01); *B60W 20/108* (2013.01); *B60W 30/18127* (2013.01); *B60L 2200/28* (2013.01); *B60L 2200/40* (2013.01); *B60L 2240/34* (2013.01); *B60W 2300/126* (2013.01); *B60W 2510/244* (2013.01); *H02J 7/1423* (2013.01); *Y02T 10/7005* (2013.01); *Y02T 10/7061* (2013.01); *Y02T 10/92* (2013.01)

(58) Field of Classification Search
CPC .............................. B60W 10/00; B60L 11/18
USPC ....................................................... 716/118
See application file for complete search history.

(56) References Cited

U.S. PATENT DOCUMENTS

| | | | |
|---|---|---|---|
| 5,712,779 A  * | 1/1998 | Sheppard et al. | ............... 363/69 |
| 6,275,004 B1 | 8/2001 | Tamai | |
| 7,199,551 B2 | 4/2007 | Gauthier | |

OTHER PUBLICATIONS

Hybrid Electric Vehicle Power Management System.

* cited by examiner

*Primary Examiner* — Thuan Do
(74) *Attorney, Agent, or Firm* — Jeffrey P. Calfa; Mark C. Bach

(57) ABSTRACT

Level voltage levels/states of charge are maintained among a plurality of high voltage DC electrical storage devices/traction battery packs that are arrayed in series to support operation of a hybrid electric vehicle drive train. Each high voltage DC electrical storage device supports a high voltage power bus, to which at least one controllable load is connected, and at least a first lower voltage level electrical distribution system. The rate of power transfer from the high voltage DC electrical storage devices to the at least first lower voltage electrical distribution system is controlled by DC-DC converters.

4 Claims, 3 Drawing Sheets

HYBRID ELECTRIC VEHICLE POWER MANAGEMENT SYSTEM

U.S. GOVERNMENT RIGHTS

This disclosure was made with United States government support under Award No. DE-EE0003303 awarded by the U.S. Department of Energy. The United States government has certain rights in this disclosure.

BACKGROUND

1. Technical Field

The technical field relates generally to motor vehicles and, more particularly, to power management of vehicle traction batteries for balancing their state of charge.

2. Description of the Technical Field

Hybrid electric vehicles typically use a high voltage, direct current (DC) electrical power storage architecture in which a plurality of high voltage DC storage devices/traction battery packs are arranged in series. The traction battery packs can be individually tapped and can be discharged at different rate/s than other traction battery packs in the series. Adding to this dynamic is the parallel support of at least one least one secondary electrical architecture (and its attendant loads) at a lower electrical voltage potential than any one traction battery pack. This situation becomes problematic when one or more of the high voltage DC storage device's voltage level/s (or more precisely state of charge which voltage level is a proxy for) deviates from others in the system by a specified amount. Depending on the level of variation in the state of charge between high voltage DC storage devices and the interval of time for which the variation is sustained, such voltage variances can result in reduced high voltage DC storage device life, performance and efficiency.

U.S. Pat. No. 6,275,004 relates to a operation of a battery pack for a hybrid-electric drive train. The system regulates the voltages and states of charge of battery modules in the battery pack to balance the charging and discharging of the individual modules. This serves to extend the cycle life of the battery pack.

SUMMARY

Level voltage levels/states of charge are maintained among a plurality of high voltage DC electrical storage devices/traction battery packs that are configured in series to support operation of a hybrid electric vehicle drivetrain at a voltage which is a multiple of the number traction battery packs. Each high voltage DC electrical storage device supports a high voltage power bus, to which at least one controllable load is connected, and at least a first lower voltage level electrical distribution system. The rate of power transfer from the high voltage DC electrical storage devices to the at least first lower voltage electrical distribution system is controlled by DC-DC converters. The rate of power transfer through each DC-DC converter is differentially set.

The system is applicable to either parallel or series hybrid drive trains and to electrical vehicles.

DETAILED DESCRIPTION

Figure 1:
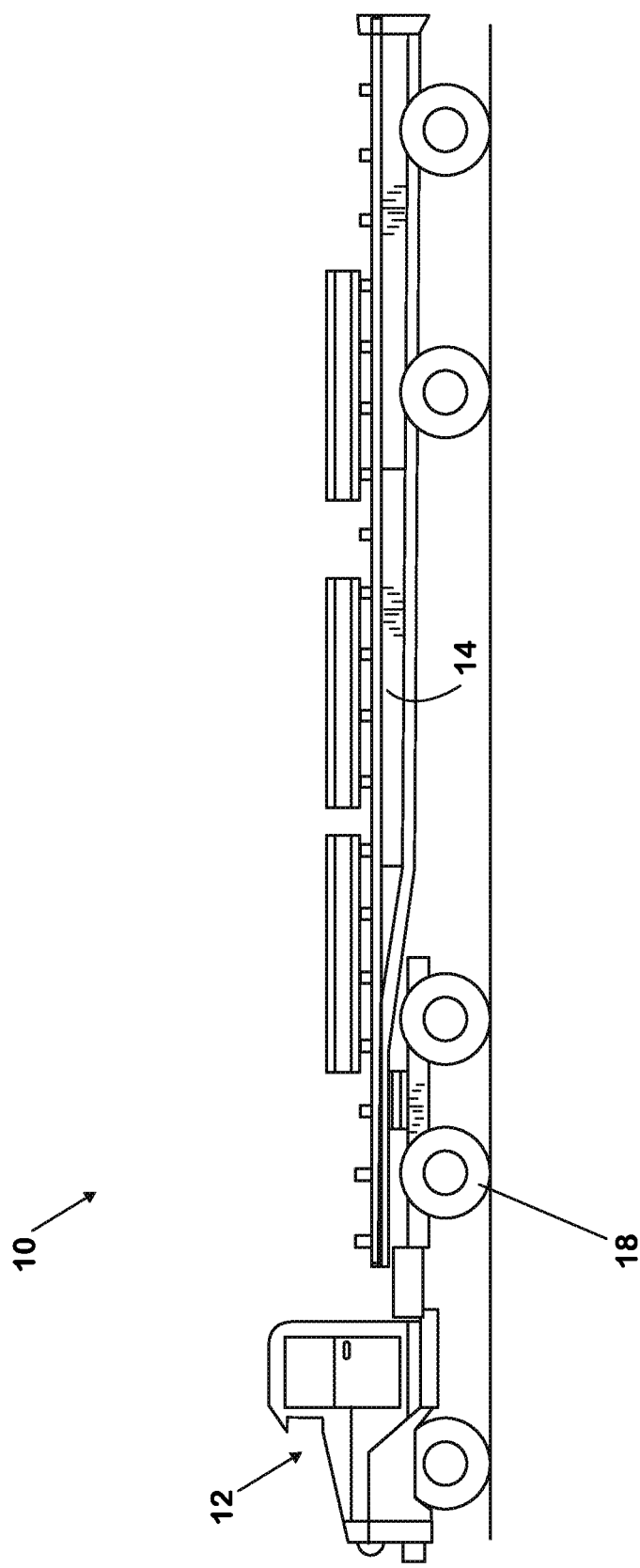
FIG. 1 is a side elevation of a truck and trailer system which may be equipped with a hybrid drive train.

In the following detailed description, like reference numerals and characters may be used to designate identical, corresponding, or similar components in differing drawing figures. Furthermore, example sizes/models/values/ranges may be given with respect to specific embodiments but are not to be considered generally limiting. In circuit diagrams well-known power and ground connections, waveguide terminating impedances and similar well-known elements, may be omitted for the sake of simplicity of illustration.

Referring now to the figures and in particular to FIG. 1, a truck/trailer combination 10 comprising a truck 12 and trailer 14 attached to one another along the axis of a fifth wheel is shown. Truck 12 includes drive wheels 18 which are operatively connected to a hybrid drive train 20. The rotation of wheels drive wheels 18 can be retarded by using them to back drive the hybrid drive train 20 to generate electricity.

Figure 2:
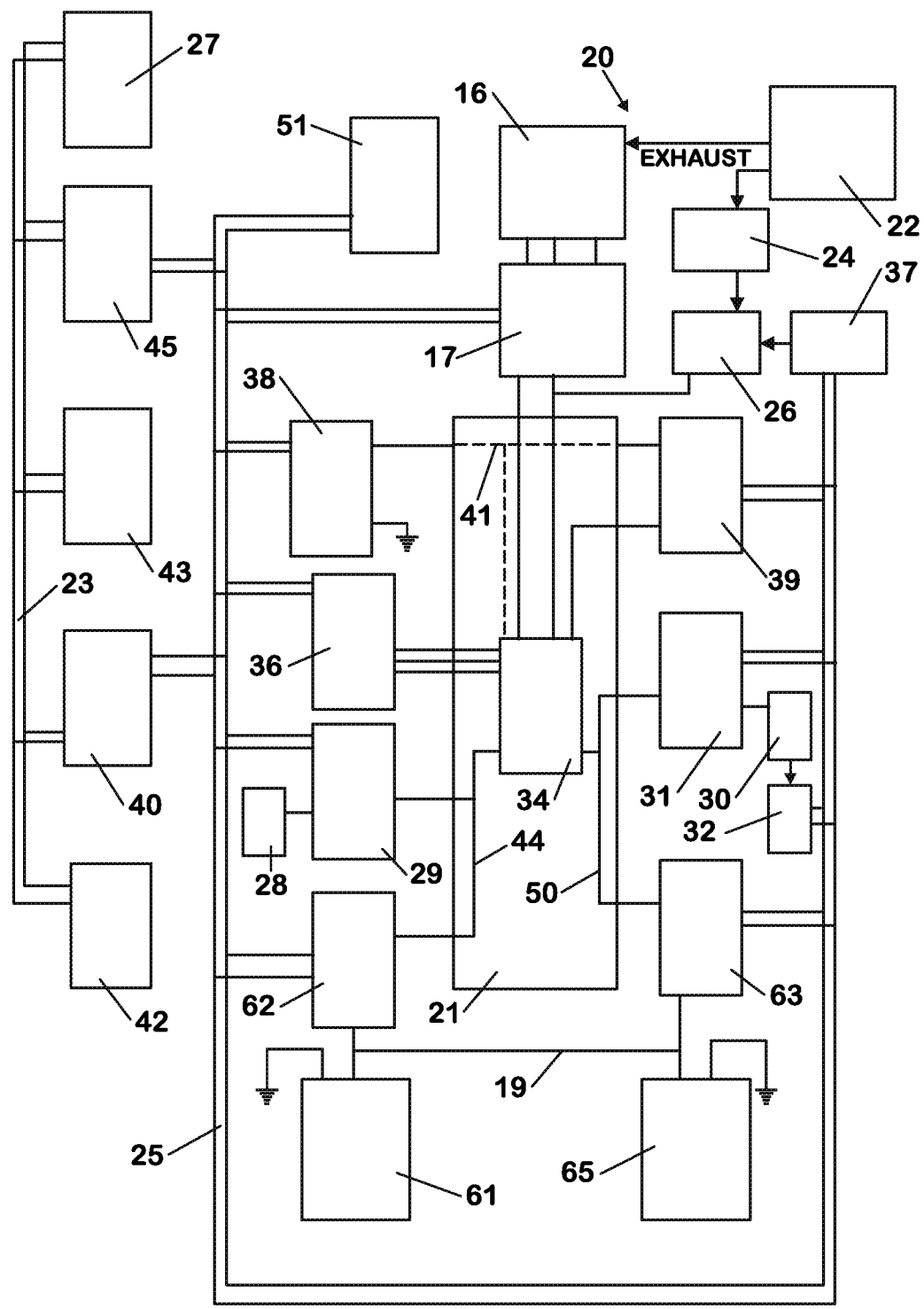
FIG. 2 is a high level block diagram of a control system and electrical power storage and distribution system for the truck of FIG. 1.

Referring to FIG. 2, hybrid truck 12 may be equipped with a hybrid electric drive train 20 having a dual mode electrical machine 16 and an internal combustion engine (ICE) 22. Dual mode electrical machine 16 can function in a generator mode for regenerative braking or in a traction motor mode. The electrical machine can supply power to or draw power from 350 volt high voltage (fraction) battery packs 38, 39 through a high voltage distribution system (HVDS) 21 and a hybrid system inverter/controller 17. HVDS 21 supplies 700 volt DC power to hybrid inverter/controller 17 where typically it is converted to three phase alternating current. Battery packs 38, 39 are connected in series along series connection 41 from the positive output of battery pack 38 to the negative terminal of battery pack 39 to supply power at 700 volts DC, or at what is termed in the claims, the fraction voltage level. The positive terminals of both battery packs 38, 39 are connected to an isolation contactor sub-system 34 in HVDS 21. Dual mode electrical machine 16 and 350 volt traction batteries 38, 39 alternate as the major sources of power through the HVDS 21. High voltage (traction) battery packs 38, 39 include internal battery management systems which report the battery voltage or some other proxy indication of the battery pack state of charge (SOC).

There are possible secondary sources of power. Usually one or more chassis batteries 61, 65 are provided on a truck 12 to supply power to and stabilize voltage on a low (12 volt) voltage electrical power distribution system 19. Twelve volt systems have been common on motor vehicles for decades and a large variety of electrical appliances and lighting exist for 12 volt systems. In addition the 12 volt low voltage distribution system 19 may be used to support relatively low noise electrical power to the on-board vehicle management computers. Usually the chassis batteries 61, 65 of the 12 volt system are kept charged by power from the high voltage system and the batteries (and their power distribution systems) are connected to the HVDS 21 by at least two bi-directional DC-DC converters 62, 63, respectively. Because the DC-DC converters 62, 63 are bi-directional the possibility exists for the 12 volt system to supply power to the HVDS 21. Here however they allow power for the low voltage power distribution system 19 to be sourced differentially from one or the other of traction battery packs 38 or 39 to meet to the power requirements of the 12 volt system.

Other electrical power sources may be available, such as external power or other heat recovery based systems on board the vehicle. Turbo-compounding exemplifies such systems as embodied in an exhaust turbine 24 driven turbo compounding generator 26. Turbo-compounded generator 26 supplies 700 volt DC power. If excess power is being supplied by the hybrid drive train 20 and secondary source, such as the turbo-compounded generator 26, power generation may be reduced under the control of the ESC 40 or the power may be sunk to a parasitic load. Power generation reduction may be implemented by turning off excitation fields for the turbo-compounded generator 26. It is possible too to reduce regenerative braking generated power by a request to the anti-lock brake system (ABS) controller 43 to displace regenerative braking with service brake braking.

HVDS 21 provides first and second internal DC buses, namely high voltage accessory buses 44, 50 either of which may be used to supply power to an accessory motor, among other loads at first and second voltage levels intermediate the voltage level of power supplied to the hybrid inverter/controller 17 and the voltage level on the low voltage distribution system 18. Usually, the first and second intermediate power levels are both 350 volts DC. Power is supplied to buses 44, 50 from an isolation contactor sub-system 34 which operates to supply power from traction battery packs 38, 39 to the hybrid inverter/controller 17 (at 700 volts DC) or to buses 44, 50 (at 350 volts) and vice versa. Power on accessory (intermediate voltage) bus 44 is drawn primarily from battery pack 38 and power on accessory (intermediate voltage) bus 50 is drawn primarily from battery pack 39 which can result in unequal rates of discharge of the fraction battery packs. Bus 44 may be taken as embodying a 350 volt to chassis ground system while bus 50 embodies a 700 volt to 350 volt system (a 350 volt difference).

There are several electrical power loads to which HVDS 21 can deliver power. Implicitly, the traction battery packs 38, 39 alternate with dual mode electrical machine 16 as loads. The 12 volt power distribution system is usually a load on HVDS 21 but one which may be supported from power bus 44, power bus 50, or both power buses at independent rates. In addition, truck 12 may be equipped with several high voltage accessory motors 28, 30. High voltage (350 volt) accessory motors 28, 30 may be substituted for more common 12 volt motors as a weight saving measure.

Accessory motors 28, 30 are mechanically coupled to mechanical loads such as air conditioning compressors, pneumatic pumps and the like. It is sometimes possible to operate these loads as parasitic power sinks. For example, a pneumatic pump may be provided to provide compressed air for a vehicle service brake system. However, it is possible to open the valves of a pneumatic system so that the air is drawn from the atmosphere, compressed, and discharged back to the atmosphere. This could be done under circumstances where hybrid drive train 20 was generating more electricity than the HVDS 21 could absorb because all loads were fully satisfied and the traction battery packs 38, 39 were at a full state of charge or were already absorbing power at the maximum rate of charge. Providing for operation of a load in a parasitic mode allows use of the hybrid drive train 20 to slow the truck 12 beyond the capacity of the system to absorb regenerative power while sparing use of the truck's service brakes (not shown).

Management of power generation, accessory operation and of the traction battery packs 38, 39 is handled by a control system pertinent aspects of which are illustrated in FIG. 2. Contemporary vehicle management is typically based on networks connecting microcontrollers for major systems. For example a vehicle may include (ABS) controller 43, a transmission control unit (TCU) 42, a hybrid control unit (HCU) 51, and engine control unit (ECU) 45 and a general body computer (electronic system controller (ESC) 40). There are also an accessory motor controller 29 (for motor 28) and an accessory motor controller 31 (for motor 30). It is contemplated that load 32 includes a controller of some nature as to fraction battery packs 38, 39 and bi-directional DC-DC converters 62, 63 and that the load can be operated parasitically. A type of controller referred to as remote power modules (RPM) 36, 37 are also shown. RPMs 36, 37 function in effect as extensions of ESC 40 and control operation of the isolation contactor sub-system 34 and turbo-compounding generator 26.

The assorted RPMs and control units are nodes on one or both of two controller area networks (CAN). One network is based on a drive train CAN data link 23 connecting the TCU 42, the ECU 45, the ABS 43 and the ESC 40. A second network is based on a hybrid CAN data link 25 which links ESC 40, ECU 45, HCU 51, the high voltage fraction battery packs 38 and 39, the accessory motor controllers 29, 31, RPMs 36, 37 and the bi-directional DC-DC converters 62, 63.

Isolation contactor sub-system 34, under the control of RPM 36, provides for routing of power through the sub-system by closing and opening of individual contactors. RPM 37, under the control of ESC 40, can provide for engaging and disengaging turbo-compounding generator 26 by turning on and off excitation fields. Bi-directional DC-DC converters 62, 63 may be turned on and off or the power flow through them adjusted differentially to level the loads on the respective high voltage accessory buses 44, 50 or to deliberately unbalance the loads in order to level the states of charge on the high voltage traction battery packs 38, 39.

The rate at which high voltage traction fraction battery packs 38, 39 can accept charge is a function of the battery packs state of charge (SOC). The potential rate of charge varies with changes in the condition in the batteries over time. If the traction batteries are fully charged they cannot accept further charging. The battery management systems may include empirically developed tables which will indicate the rate at which the batteries can accept charge (termed here the "available charge rate") as a function of battery state of charge, battery age and charge cycle history, battery temperature and other variables. The available charge rate can be reported to the ESC 40 from the battery management system for each traction battery pack 38, 39, with the value being subject to constant updating and informing the process maintaining a balanced SOC between the traction battery packs 38, 39.

Reconfigurable software is used with the electrical hardware architecture represented by the nodes of the hybrid CAN data link 25 and can be used to control the rates of electrical discharge and charge, and balance between the high voltage traction battery packs 38, 39. One method of implementing this is through the "exogenous" bi-directional DC-to-DC converters 62, 63. Control over electrical discharge rate and balance is achieved by placing the bi-direction DC-to-DC converters 62, 63 between each of the vehicle's high voltage DC electrical storage devices and the vehicle's low (12 volt) voltage electrical distribution system. The low voltage output from the DC-to-DC converters can be paralleled into the same low voltage storage device group or their outputs can be configured as series circuit maintaining individual support for low voltage electrical energy storage devices (twelve volt chassis batteries 61, 65) based on data link commands generated by ESC 40 or low voltage supervisory controller.

The ESC 40 monitors the amount of power being sourced by each high voltage DC electrical energy storage devices, illustrated here as traction battery packs 38, 39, and depending on the amount of electrical energy outflow the ESC 40, the relative states of charge of the traction battery packs 38, 39 and power availability from the hybrid inverter/controller 17 and turbo-compounding generator 26 (if installed), individually instructs the DC-to-DC converter/s 62, 63 to increase or decrease the energy flow through the respective converters to meet power demand on the low voltage power distribution system 19. One operational criterion to meet is meeting power demand on the low voltage power distribution system. A second criterion to meet is equalizing the states of charge on the fraction battery packs 38, 39. A third criterion is maintaining even aggregate loading on the traction battery packs 38, 39 so that their respective states of charge remain in balance.

The ESC 40 is further programmed to simultaneously modify the operation and performance of various high voltage loads supported by the high voltage DC electrical energy storage devices (traction battery packs 38, 39) through energy delivery as is appropriate based on the operational vehicle dynamics to assist in balancing the states of charge of traction battery packs. ESC 40 communicates traction battery pack 38, 39 performance data, low voltage data and bi-directional DC-to-DC converter 62, 63 performance through a driver/operator display device 27 which may be coupled to the drive train CAN data link 23.

An example system could be configured as follows. Two 350 volt battery packs are connected in series to support a 700 volt DC bus for the operation of one or more electric machines whose electromotive forces are intended for propulsion of the vehicle. Each 350 volt battery pack supports one of two separate 350 volt DC buses for the purpose of powering various 350 volt electrified accessories (e.g., motors for power steering, a Freon compressor, a pneumatic compressor and the like). Power is supplied to the buses from the 350 volt battery packs, from the vehicle traction motor, and potentially from other secondary sources such an exhaust turbine driven generator. Two DC-to-DC converters (one allocated to each high voltage DC bus) are controlled by an electrical system controller/body computer to offset imbalances occurring in voltage levels of the two 350 volt battery packs. These would typically result from unequal loading on the buses from the electrified accessories. The high voltage electrical energy is down converted by the DC-to-DC converters to support a truck 12 volt DC ("low voltage") electrical architecture. The body computer can also alter the operation of any or all electrified accessory operation to supplement the DC-to-DC converters to control the total load on each 350 volt battery pack. This can include operating low voltage accessories to consume excess power down converted by the DC-to-DC converter/s to assist in maintaining a adequate power level loading or operating high voltage accessories as power sinks Total power generation can be adjusted by control over a turbo-compounded generator if present.

Figure 3:
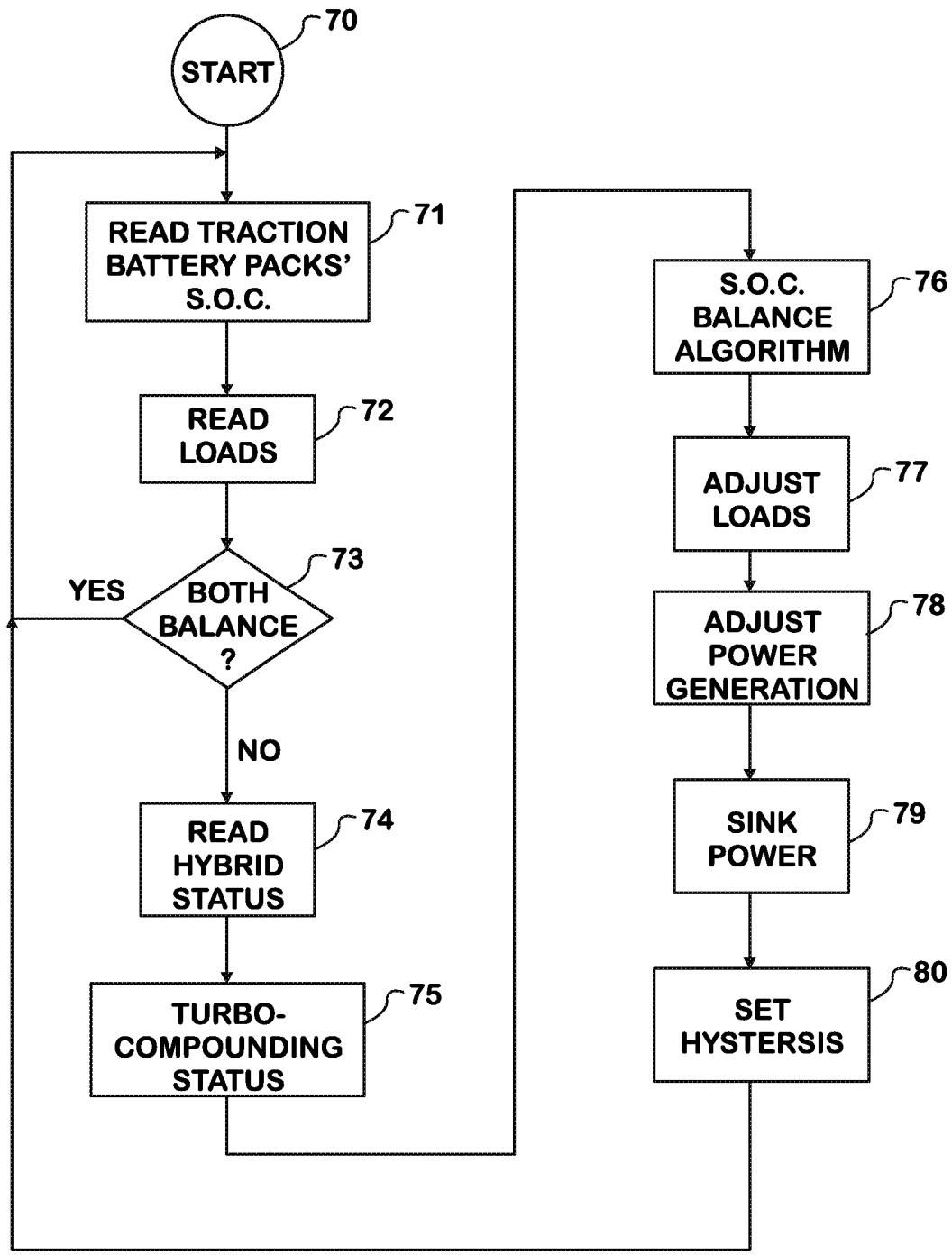
FIG. 3 is a high level flow chart illustrating operational steps taken by the electrical system controller.

FIG. 3 illustrates a possible organization of operation of the ESC 40 to implement load and state of charge balancing for high voltage electrical power storage devices on a vehicle. Upon start up (step 70) the state of charge (SOC) of the traction battery packs 38, 39 is read (step 71). Next, at step 72, the loads are read. If the traction battery pack 38, 39 states of charge are in balance and the loads are in balance the operation loops back to step 71. If either is out of balance steps may be taken to level the loads to maintain the SOC balance of the traction battery packs 38, 39, or steps may be taken to unbalance the loads to return the traction battery packs 38, 39 to a level SOC. Step 74, "read hybrid status" relates to determining how much regenerative power is available, if any. Next, at step 75 it is determined how much power is being provided from a turbo-compounded generator. The balance operation may then be undertaken (step 76). The usual first response (step 77) to adjust loads, usually by controlling power flow through a pair of bi-directional DC-DC converters 77 to restore a load balance if the loads are out of balance, or to introduce a load imbalance if the SOC are out of balance. Step 78, "adjust power generation" relates to adjustments made to balance instantly generated power with system aggregate demand, such as turning on or off a turbo-compounded generator or substituting service braking for regenerative braking Finally, step 79 reflects the possibility of sinking power, usually by operation of a high voltage accessory system in a parasitic mode. The order of steps 77-79 is unimportant. Finally, step 80, "set hysteresis," reflects a built in delay to prevent excessive on/off cycling of components.

What is claimed is:

1. A vehicle comprising:
   first and second high voltage battery packs connected in series for supplying direct current electricity at a traction voltage level;
   a first accessory power bus connectable across the first traction battery pack to supply direct current electricity at a first intermediate voltage level;
   a second accessory power bus connectable across the second traction battery pack to supply direct current electricity at a second intermediate voltage level;
   a variable load connected to the first accessory power bus;
   a variable load connected to the second accessory power bus;
   a low voltage electric power distribution system;
   a first direct current to direct current converter connected between the first accessory power bus and the low voltage electric power distribution system;
   a second direct current to direct current converter connected between the first accessory power bus and the low voltage electric power distribution system;
   a electrical system controller for varying power flow through the first and second direct current to direct current converters responsive to changes in the variable loads connected to the first and second accessory power buses;
   the electrical system controller being further responsive to relative variations in the states of charge of the first and second high voltage battery packs for varying power flow through the first and second direct current to direct current converters;
   an electrical machine operable in a traction motor mode or a power generation mode and connected in series with the first and second high voltage battery packs to draw and supply electrical power at the traction voltage level;
   a turbo-compounded generator; and
   the electrical system controller being responsive to aggregate load for activating and deactivating the turbo-compounded generator.

2. A vehicle as set forth in claim 1, further comprising:
   the electrical system controller providing for control over changes in the variable loads connected to the first and second accessory buses and being further responsive to differentiation in the relative states of charge of the first and second high voltage battery packs in exercising control.

3. A vehicle as set forth in claim 2, the first and second intermediate voltage levels being nominally equal.

4. A vehicle as set forth in claim 1, further comprising:
   low voltage batteries connected to the low voltage distribution system.

* * * * *